United States Patent
Hung et al.

(10) Patent No.: US 7,443,318 B2
(45) Date of Patent: Oct. 28, 2008

(54) HIGH SPEED CONTEXT MEMORY IMPLEMENTATION FOR H.264

(75) Inventors: Chun Kit Hung, Kowloon (HK); Kin Wing An, New Territories (HK)

(73) Assignee: Hong Kong Applied Science and Technology Research Institute Co. Ltd., Hong Kong (CN)

( * ) Notice: Subject to any disclaimer, the term of this patent is extended or adjusted under 35 U.S.C. 154(b) by 0 days.

(21) Appl. No.: 11/694,311

(22) Filed: Mar. 30, 2007

(65) Prior Publication Data
US 2008/0240234 A1    Oct. 2, 2008

(51) Int. Cl.
*H03M 7/34* (2006.01)
*H03M 7/38* (2006.01)
(52) U.S. Cl. .................. 341/51; 341/107
(58) Field of Classification Search .......... 341/107, 341/67, 51; 382/247
See application file for complete search history.

(56) References Cited

U.S. PATENT DOCUMENTS

| | | | |
|---|---|---|---|
| 6,812,873 B1 | 11/2004 | Siohan et al. | |
| 6,856,701 B2 | 2/2005 | Karczewicz et al. | 382/247 |
| 6,894,628 B2 | 5/2005 | Marpe et al. | 341/107 |
| 6,943,710 B2 | 9/2005 | Marpe et al. | 341/106 |
| 7,321,323 B2 * | 1/2008 | Sekiguchi et al. | 341/107 |
| 2005/0018774 A1 | 1/2005 | Winger et al. | |
| 2005/0249289 A1 | 11/2005 | Yagasaki et al. | |
| 2005/0259747 A1 | 11/2005 | Schumann | |
| 2006/0123029 A1 | 6/2006 | LeTourneau | |
| 2006/0126744 A1 | 6/2006 | Peng et al. | |
| 2007/0030180 A1 | 2/2007 | Yang et al. | |
| 2007/0040708 A1 | 2/2007 | Senda | |

FOREIGN PATENT DOCUMENTS

| | | |
|---|---|---|
| CN | 1909660 | 2/2007 |
| WO | WO2004/034330 | 4/2004 |

* cited by examiner

*Primary Examiner*—Peguy JeanPierre
(74) *Attorney, Agent, or Firm*—Fish & Richardson, P.C.

(57) ABSTRACT

Disclosed is a context modeller (103) used in decoding data (202) encoded using Context Adaptive Binary Arithmetic Coding, said context modeler (103) comprising a Read Only Memory (1001) for storing uninitialized context model values, said uninitialized context model values being stored in the Read Only Memory (1001) in a manner that enables a plurality of uninitialized context model values to be read from the Read Only Memory (1001) in a single clock cycle, an Arithmetic Logic Module (1003) comprising a plurality of parallel processing paths (2202-2207), each said processing path comprising a plurality of pipeline stages, a Random Access Memory (1005) and a memory controller (1008) for determining, using the Arithmetic Logic Module (1005) operating on said plurality of uninitialized context model values read from the Read Only Memory (1001) in each clock cycle, initialized context model values for storage in the Random Access Memory (1001) based upon header information in said incoming encoded data (202).

16 Claims, 16 Drawing Sheets

| Context Model | Slice Type | Model Number | Number of CM | Number of Model | Memory Index from Micro Blaze |
|---|---|---|---|---|---|
| CTX_MB_TYPE | I | N0 | 33 | 4 | [0:32] |
| | P | N0 | | | |
| | P | N1 | | | |
| | P | N2 | | | |
| CTX_B8_TYPE | P | N0 | 10 | 3 | [33:42] |
| | P | N1 | | | |
| | P | N2 | | | |
| CTX_MV_RES | P | N0 | 20 | 3 | [43:62] |
| | P | N1 | | | |
| | P | N2 | | | |
| CTX_REF_NO | P | N0 | 6 | 3 | [63:68] |
| | P | N1 | | | |
| | P | N2 | | | |
| CTX_DELTA_QP | I or P | N0 | 4 | 1 | [69:72] |
| CTX_MBAFF | I | N0 | 4 | 4 | [73:76] |
| | P | N0 | | | |
| | P | N1 | | | |
| | P | N2 | | | |
| CTX_IPR | I or P | N0 | 2 | 1 | [77:78] |
| CTX_CIPR | I or P | N0 | 4 | 1 | [79:82] |
| CTX_CBP | I | N0 | 12 | 4 | [83:94] |
| | P | N0 | | | |
| | P | N1 | | | |
| | P | N2 | | | |
| CTX_BCBP | I | N0 | 20 | 4 | [95:114] |
| | P | N0 | | | |
| | P | N1 | | | |
| | P | N2 | | | |
| CTX_MAP | I | N0 | 75 | 4 | [115:189] |
| | P | N0 | | | |
| | P | N1 | | | |
| | P | N2 | | | |
| CTX_LAST | I | N0 | 75 | 4 | [190:264] |
| | P | N0 | | | |
| | P | N1 | | | |
| | P | N2 | | | |
| CTX_ONE | I | N0 | 25 | 4 | [265:289] |
| | P | N0 | | | |
| | P | N1 | | | |
| | P | N2 | | | |
| CTX_ABS | I | N0 | 25 | 4 | [290:314] |
| | P | N0 | | | |
| | P | N1 | | | |
| | P | N2 | | | |
| CTX_FLD_MAP | I | N0 | 75 | 4 | [315:389] |
| | P | N0 | | | |
| | P | N1 | | | |
| | P | N2 | | | |
| CTX_FLD_LAST | I | N0 | 75 | 4 | [390:464] |
| | P | N0 | | | |
| | P | N1 | | | |
| | P | N2 | | | |
| | | Total | 465 | | |

Fig. 8

| Context Model | ROM Address (Address/ Slice Type/Model) | | | |
|---|---|---|---|---|
| | I / N0 | P / N0 | P / N1 | P / N2 |
| CTX_MB_TYPE | [0:32]<br>I / N0 | [468:500]<br>P / N0 | [936:968]<br>P / N1 | [1404:1436]<br>P / N2 |
| CTX_B8_TYPE | [33:42]<br>P / N0 (DON'T CARE) | [501:510]<br>P / N0 | [969:978]<br>P / N1 | [1437:1446]<br>P/N2 |
| CTX_MV_RES | [43:62]<br>P / N0 (DON'T CARE) | [511:530]<br>P / N0 | [979:998]<br>P / N1 | [1447:1466]<br>P / N2 |
| CTX_REF_NO | [63:68]<br>P / N0 (DON'T CARE) | [531:536]<br>P / N0 | [999:1004]<br>P / N1 | [1467:1472]<br>P / N2 |
| CTX_DELTA_QP | [69:72]<br>IP / N0 | [537:540]<br>IP / N0 | [1005:1008]<br>IP / N0 | [1473:1476]<br>IP / N0 |
| CTX_MBAFF | [73:76]<br>I / N0 | [541:544]<br>P / N0 | [1009:1012]<br>P / N1 | [1477:1480]<br>P / N2 |
| CTX_IPR | [77:78]<br>IP / N0 | [545:546]<br>IP / N0 | [1013:1014]<br>IP / N0 | [1481:1482]<br>IP / N0 |
| CTX_CIPR | [79:82]<br>IP / N0 | [547:550]<br>IP / N0 | [1015:1018]<br>IP / N0 | [1483:1486]<br>IP / N0 |
| CTX_CBP | [83:94]<br>I / N0 | [551:562]<br>P / N0 | [1019:1030]<br>P / N1 | [1487:1498]<br>P / N2 |
| CTX_BCBP | [95:114]<br>I / N0 | [563:582]<br>P / N0 | [1031:1050]<br>P / N1 | [1499:1518]<br>P / N2 |
| CTX_MAP | [115:189]<br>I / N0 | [583:657]<br>P / N0 | [1051:1125]<br>P / N1 | [1519:1593]<br>P / N2 |
| CTX_LAST | [190:264]<br>I / N0 | [658:732]<br>P / N0 | [1126:1200]<br>P / N1 | [1594:1668]<br>P / N2 |
| CTX_ONE | [265:289]<br>I / N0 | [733:757]<br>P / N0 | [1201:1225]<br>P / N1 | [1669:1693]<br>P / N2 |
| CTX_ABS | [290:314]<br>I / N0 | [758:782]<br>P / N0 | [1226:1250]<br>P / N1 | [1694:1718]<br>P / N2 |
| CTX_FLD_MAP | [315:389]<br>I / N0 | [783:857]<br>P / N0 | [1251:1325]<br>P / N1 | [1719:1793]<br>P / N2 |
| CTX_FLD_LAST | [390:464]<br>I / N0 | [858:932]<br>P / N0 | [1326:1400]<br>P / N1 | [1794:1868]<br>P / N2 |
| ZERO PADDING | [465:467]<br>ZERO | [933:935]<br>ZERO | [1401:1403]<br>ZERO | [1869:1871]<br>ZERO |
| Number of Memory Location inside a 64 bits ROM | 117 | | | |

Fig. 11

HIGH SPEED CONTEXT MEMORY IMPLEMENTATION FOR H.264

FIELD OF THE INVENTION

The present invention relates generally to video coding and, in particular, to video decoding using Context Adaptive Binary Arithmetic Coding (CABAC).

BACKGROUND

Digital video data is typically compressed to reduce storage capacity and/or transmission bandwidth requirements. The ITU-T H.264 standard for compression/decompression of digital video signals supports Context-based Adaptive Binary Arithmetic Coding (CABAC), which is an efficient form of entropy coding that continuously adapts to the statistical properties of the data being coded. For example, CABAC coding/decoding requires much lower bit rate compared to MPEG-2 coding/decoding to achieve the same general quality of video reproduction. Although relatively more efficient than the Huffman coding/decoding used in MPEG-2 coding/decoding, CABAC coding/decoding generally comprises a sequential multi-step process that is relatively more computationally intensive. As a consequence, parallel hardware architectures generally have limited utility in improving throughput in CABAC coding/decoding.

Each syntax element is represented in the form of binary sting after the binarization process. The binary string is decoded by the arithmetic decoder using context modelling. A Context variable becomes an input for the arithmetic decoder, where the context model state and most probable coded symbol form a single context variable. The context variable is updated while passing through the arithmetic decoding process. The context memory contains all context variables of all context models for CABAC.

SUMMARY

It is an object of the present invention to substantially overcome, or at least ameliorate, one or more disadvantages of existing arrangements.

Disclosed are arrangements, referred to as the Rearranged Uniform Context Memory (or RUCM) arrangements, which rearrange the data structure used by the decoder context memory into a uniform structure, thereby enabling the use of pipelining and parallel processing techniques that improve the speed of context model memory initialization, and provide a simple method by which the decoding system can access the content of the context model.

The uninitialized data structure is re-arranged into different categories. Those categories are packed with the same amount of data. This data structure can help to enhance the hardware performance by applying the pipeline and parallel processing techniques. A 512×64 bit ROM is used to store the uninitialized data. Four sets of uninitialized data are stored inside the same memory location such that four sets of data can be loaded and initialized at the same time (ie concurrently). This typically reduces the overhead associated with the decoding process for each slice. Arithmetic logic is replicated to form four sets of logic, such that, in the described example, a six stage pipeline and the four replicated logic modules perform parallel processing. This typically achieves the disclosed high throughput initialization process. When reading the memory, a 32 bits to 8 bits (and conversely a 8 bits to 32 bits) "read after write" memory access mechanism is used to simplify the memory access logic. Furthermore, by using two source clocks, further reduction of the initialization time is typically achieved without significant increase in complexity.

According to a first aspect of the present invention, there is provided a method of decoding a data stream comprising a plurality of video frames that have been encoded using Context-based Adaptive Binary Arithmetic Coding, the method comprising the steps of:

decomposing a current video frame into slices each comprising slice data and slice header information;

storing a context model comprising a plurality of context model values in a manner that enables concurrent processing of a set of the context model values;

identifying a non-bypass slice;

initializing the context model using header information of the identified slice; and decoding the slice data of the identified slice dependent upon the initialized context model.

According to another aspect of the present invention, there is provided an apparatus for decoding a data stream comprising a plurality of video frames that have been encoded using Context-based Adaptive Binary Arithmetic Coding, said apparatus comprising:

a memory for storing a program; and a processor for executing the program, said program comprising:

code for decomposing a current video frame into slices each comprising slice data and slice header information;

code for storing a context model comprising a plurality of context model values in a manner that enables concurrent processing of a set of the context model values;

code for identifying a non-bypass slice;

code for initializing the context model using header information of the identified slice; and code for decoding the slice data of the identified slice dependent upon the initialized context model.

According to another aspect of the present invention, there is provided an apparatus for decoding a data stream comprising a plurality of video frames that have been encoded using Context-based Adaptive Binary Arithmetic Coding, the apparatus comprising:

means for decomposing a current video frame into slices each comprising slice data and slice header information;

means for storing a context model comprising a plurality of context model values in a manner that enables concurrent processing of a set of the context model values;

means for identifying a non-bypass slice;

means for initializing the context model using header information of the identified slice; and means for decoding the slice data of the identified slice dependent upon the initialized context model.

According to another aspect of the present invention, there is provided a context modeller used in decoding data encoded using Context Adaptive Binary Arithmetic Coding, said context modeler comprising:

a Read Only Memory for storing uninitialized context model values, said uninitialized context model values being stored in the Read Only Memory in a manner that enables a plurality of uninitialized context model values to be read from the Read Only Memory in a single clock cycle;

an Arithmetic Logic Module comprising a plurality of parallel processing paths, each said processing path comprising a plurality of pipeline stages;

a Random Access Memory; and a memory controller for determining, using the Arithmetic Logic Module operating on said plurality of uninitialized context model values read from the Read Only Memory in each clock cycle, initialized context model values for storage in the Random Access Memory based upon header information in said incoming encoded data.

Other aspects of the invention are also disclosed.

BRIEF DESCRIPTION OF THE DRAWINGS

One or more embodiments of the present invention will now be described with reference to the drawings, in which:

FIG. 8 shows uninitialized context model information arranged in tabular form 1600;

FIG. 11 shows an expanded view of the data structure of FIG. 9;

DETAILED DESCRIPTION INCLUDING BEST MODE

Figure 1:
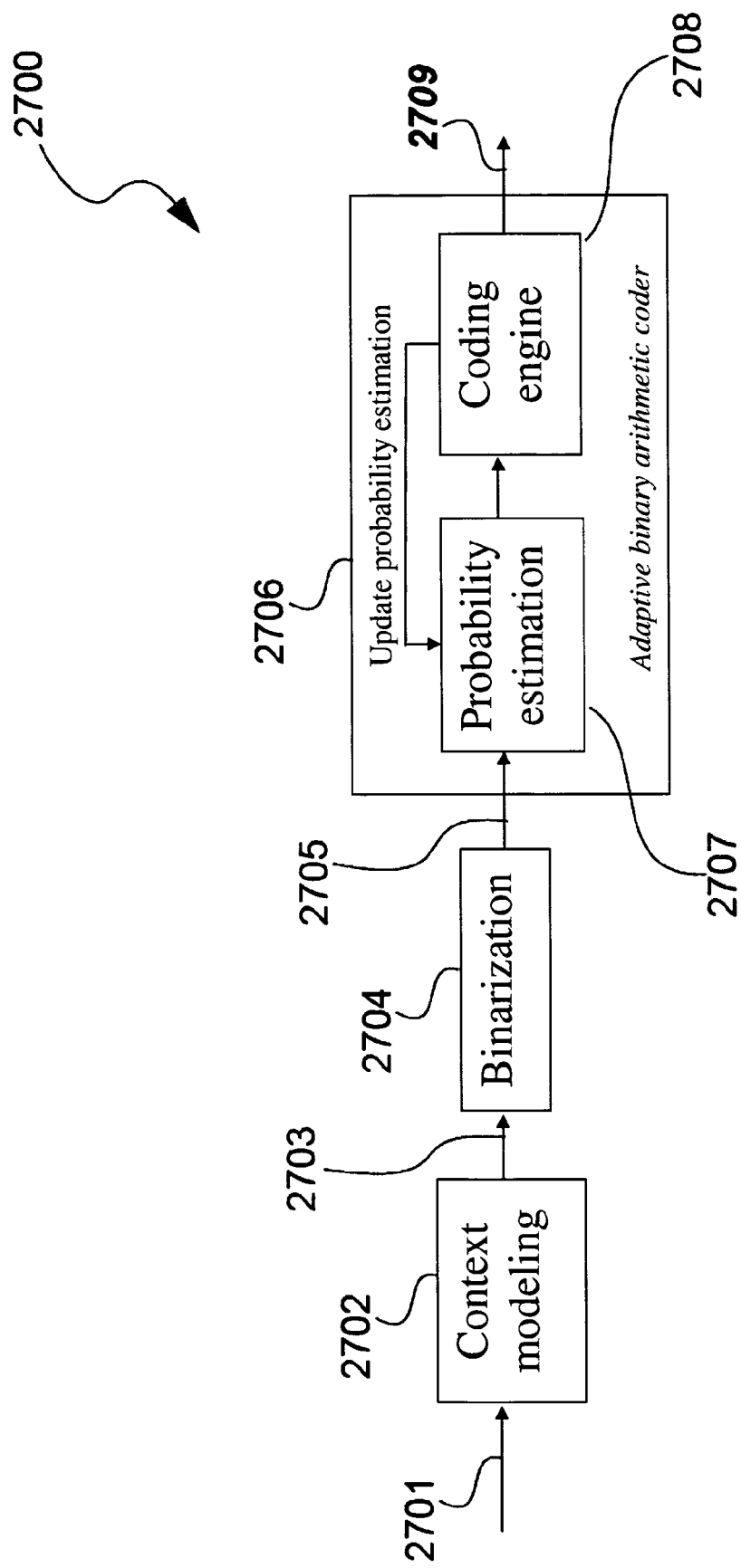
FIG. 1 shows an illustrative CABAC entropy coding arrangement, in order to establish basic CABAC concepts.

Where reference is made in any one or more of the accompanying drawings to steps and/or features, which have the same reference numerals, those steps and/or features have for the purposes of this description the same function(s) or operation(s), unless the contrary intention appears.

GLOSSARY

A number of terms of art and/or acronyms are used in this description, and the following GLOSSARY provides an explanation for these terms of art and/or acronyms:

AD

This is an Arithmetic decoder that performs arithmetic calculations/operations using an arithmetic coding algorithm. This decoder uses a context model as an input to estimate the output symbol.

AD_FSM

This is a finite-state machine for the AD module.

ALU

Arithmetic Logic Unit comprises hardware modules which perform the arithmetic operation.

Arithmetic Coder

Arithmetic coder is a hardware module which performs the arithmetic encoding and decoding.

Arithmetic Decoder

Arithmetic decoder is a hardware module which is used to perform the arithmetic decoding.

Arithmetic Logic

Arithmetic logic is a logic circuit which is used to perform the arithmetic operations.

CMi and CMj

These are context model indices for the Debinarizer module.

Context Model

The context model is a (logical) probability model for one or more bits of the binarized symbol. This model may be chosen from a selection of available models depending on the statistics of recently-coded data symbols. The context model stores the probability of each bit being "1" or "0".

Context Modeller

This is the functional module which establishes and maintains the (logical) context model.

DB_FSM

This is a finite-state machine for the DB module, this module being used to select one or more of the AD, FAD or EAD modules for use.

DB Register

This register stores the decoded DB values returned from the CABAC hardware accelerator.

EAD

This is an arithmetic decoder that performs arithmetic calculations/operations using an arithmetic coding algorithm. In this instance, the decoder uses estimated probability to estimate the output symbol, which is either '0' or '1' with a 50% probability;

EAD_FSM

This is a finite-state machine for the EAD module.

EOS

This is an "End-of-Slice" signal.

FAD

This is an arithmetic decoder that performs arithmetic calculations/operations using an arithmetic coding algorithm. This module does not use the context model as an input to estimate the output symbol.

FAD_FSM

This is a finite-state machine for the FAD module.

FSM

Finite State Machine.

m and n value

Parameters from the CABAC standard.

Model Number

A number for indexing the context model table

MPS

Most probable symbol, the most probable symbol output, either 1 or 0 from arithmetic decoder Section 1.01 MPS value see MPS

NALU

This is an "NAL unit", being a syntax structure, containing both (a) an indication of the type of data to follow, and (b) bytes containing that data in the form of an RBSP, interspersed as necessary with emulation prevention bytes (NALU=network adoption layer unit, RBSP=raw byte sequence payload).

PPS

This refers to a "Picture parameter set".

QP value

Quantization Parameter (QP) is the index for the 52 Qstep values.

Qstep

Qstep is the step size for the quantization process.

Single port RAM

Single ports RAM is a kind of memory with a single port for read and write operations.

Slice Type

Slice Type defined in the Context Model refers to the frame type. (i.e., I frame/P frame/B frame).

SPS

This refers to a "Sequence parameter set".

TreeID

This is a number that is used to select which tree structure should be used for the current decoding process. There are, in the present description, 19 tree structures inside the DB module.

This description commences with an introductory section entitled INTRODUCTION, which sets out basic concepts. Thereafter, a section entitled SYSTEM LEVEL DESCRIPTION-BACKGROUND provides a system level framework within which to consider the subsequent section entitled HIGH-SPEED CONTEXT MEMORY which is the main focus of this description.

Advanced video coding arrangements such as the H.264 standard from the International Telecommunications Union (ITU) can use entropy coders/decoders to achieve data compression. Entropy coding is a lossless coding technique that replaces data elements with coded representations which, in combination with the previously-described predictions, transformations, and quantization, can result in significantly reduced data size. A particular mode of entropy coding called Binary Arithmetic Coding (BAC), when used in a context adaptive manner, is referred to as Context Adaptive Binary Arithmetic Coding (CABAC).

FIG. 1 shows an illustrative CABAC entropy coding arrangement used to establish some basic concepts. Although the disclosed RUCM arrangements are directed at CABAC decoding arrangements, CABAC encoding arrangements are typically easier to understand than decoding arrangements and accordingly this introduction is directed as CABAC encoding.

When a symbol for an arbitrary syntax element is provided at 2701, in a first step 2702, a suitable context model is chosen according to a set of past observations of relevant syntax elements. The step 2702 is referred to as context modeling. Different models are maintained for each syntax element. If a given symbol is non-binary valued, it will be mapped onto a sequence of binary decisions in a second step 2704 referred to as binarization.

Each output slice at 2705 is encoded with an adaptive binary arithmetic coding (BAC) engine 2706 using probability estimates performed by a process 2707. These probability estimates depend on the specific context of the symbol slice being considered.

After the encoding by the coding engine 2708 of each slice, the probability estimate in the context model 2702 is updated to account for the probability estimate made for the slice that was just encoded. In this manner, the arrangement 2700 keeps track of the actual statistics experienced during the encoding process of each slice.

As noted, for explanatory purposes, the above description has been directed to CABAC encoding. CABAC based decoding, with which this description is concerned, also uses context modeling for decoding.

System Level Description—Background

Figure 2:
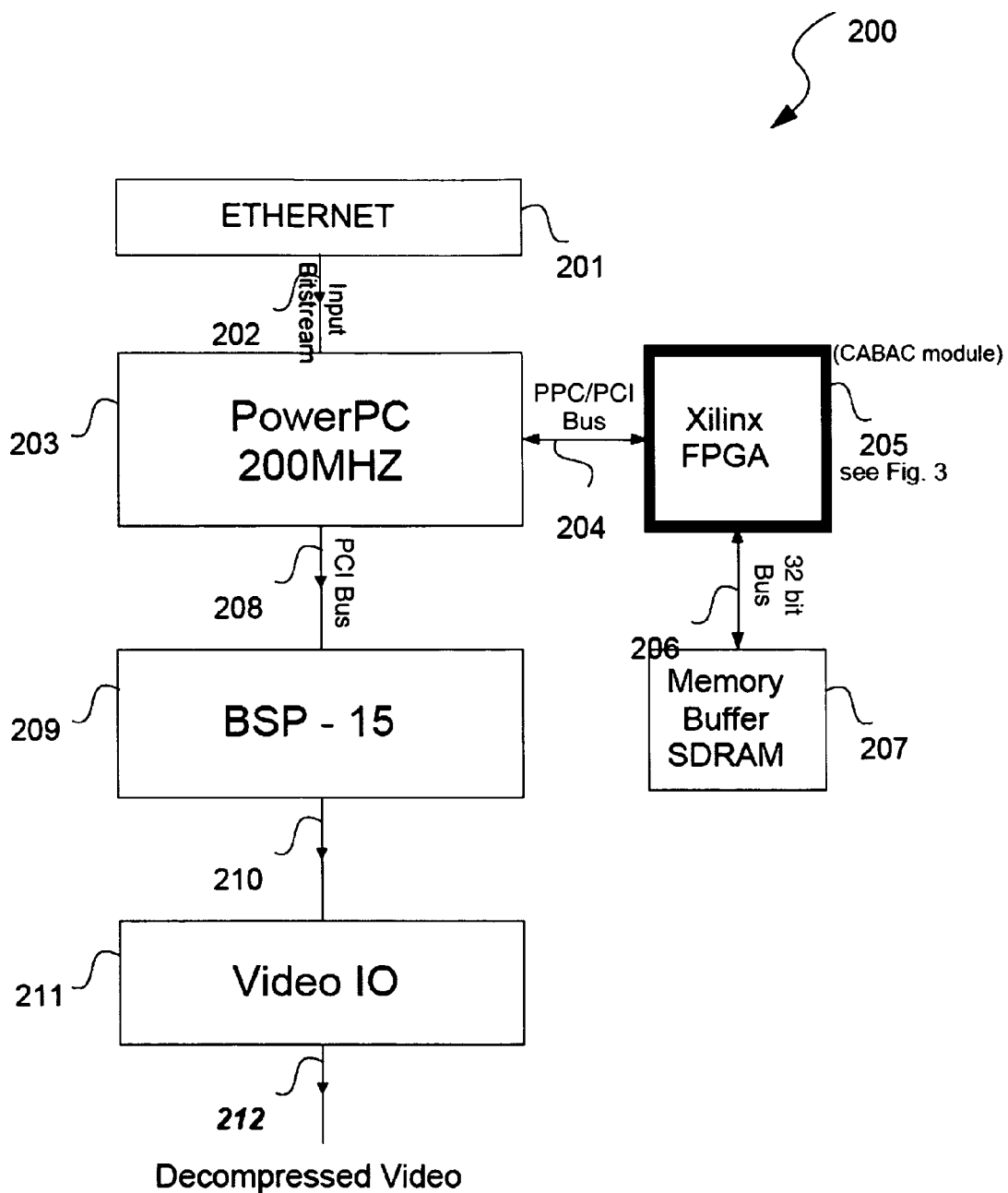
FIG. 2 is an illustrative hardware block representation of a system for performing H.264 CABAC decompression according to the disclosed RUCM approach.

FIG. 2 shows a hardware block representation 200 for performing H.264 CABAC decompression using the RUCM approach. The disclosed arrangement 200 can, in one arrangement, be implemented as a Set Top Box (STB) for reception and decoding of an incoming digital TV signal 202.

As previously noted, the disclosed RUCM arrangements are directed to decoding bit streams that have been encoded using Context-Based Adaptive Binary Arithmetic Coding (CABAC) used for H.264 main profile high quality video. The disclosed RUCM arrangements store a CABAC encoded bit stream 202 in a Memory Buffer 207 for decoding by a CABAC module 205. The RUCM arrangements provide the primary decoding sub-processes including debinarization, context modelling, and binary arithmetic coding. The disclosed RUCM approach typically reduces the processing load on a host CPU 203. The RUCM arrangements can be implemented using Field Programmable Gate Array (FPGA), System on Chip (SOC), or other technologies.

The PowerPC 203 (also referred to as the host or host processor) handles incoming video data 202 from an Ethernet based network 201. The FPGA based CABAC module 205 is a co-processor which performs CABAC decoding of the incoming data 202. The host 203 writes a bit stream 204 of CABAC coded data into the CABAC module 205, and reads a decoded bit stream 204 from the CABAC module 205 for onward transmission, as depicted by an arrow 208. The aforementioned operation is performed with high performance and low processing time. A BSP-15 IE 209 decodes the incoming video bitstream 208 and writes the decoded video picture 210 to VIDEO IO IE 211 as depicted by an arrow 210 for the data flow. The VIDEO IO IE 211 displays the decoded video sequence through the display device.

The host 203 extracts an SPS/PPS/Slice NALU from the incoming encoded data stream 202, and stores encoded data in a buffer in the host 203, after de-packetization of the incoming video network stream 202. Each NALU extracted in this manner is transferred to the CABAC module 205 and then stored in the SDRAM buffer 207. The CABAC module 205 performs CABAC decoding, using the RUCM approach, of the NALU stored in the SDRAM buffer memory 207, and stores the decoded binary string in an output buffer 301 of the CABAC module 205 (see FIG. 3). The host 203 reads the decoded data from the output buffer 301. A dual buffer mechanism is used in the CABAC module 205 for data input/output. The various structural modules used in the disclosed RUCM arrangement are now briefly described in FIGS. 3 and 1.

Figure 3:
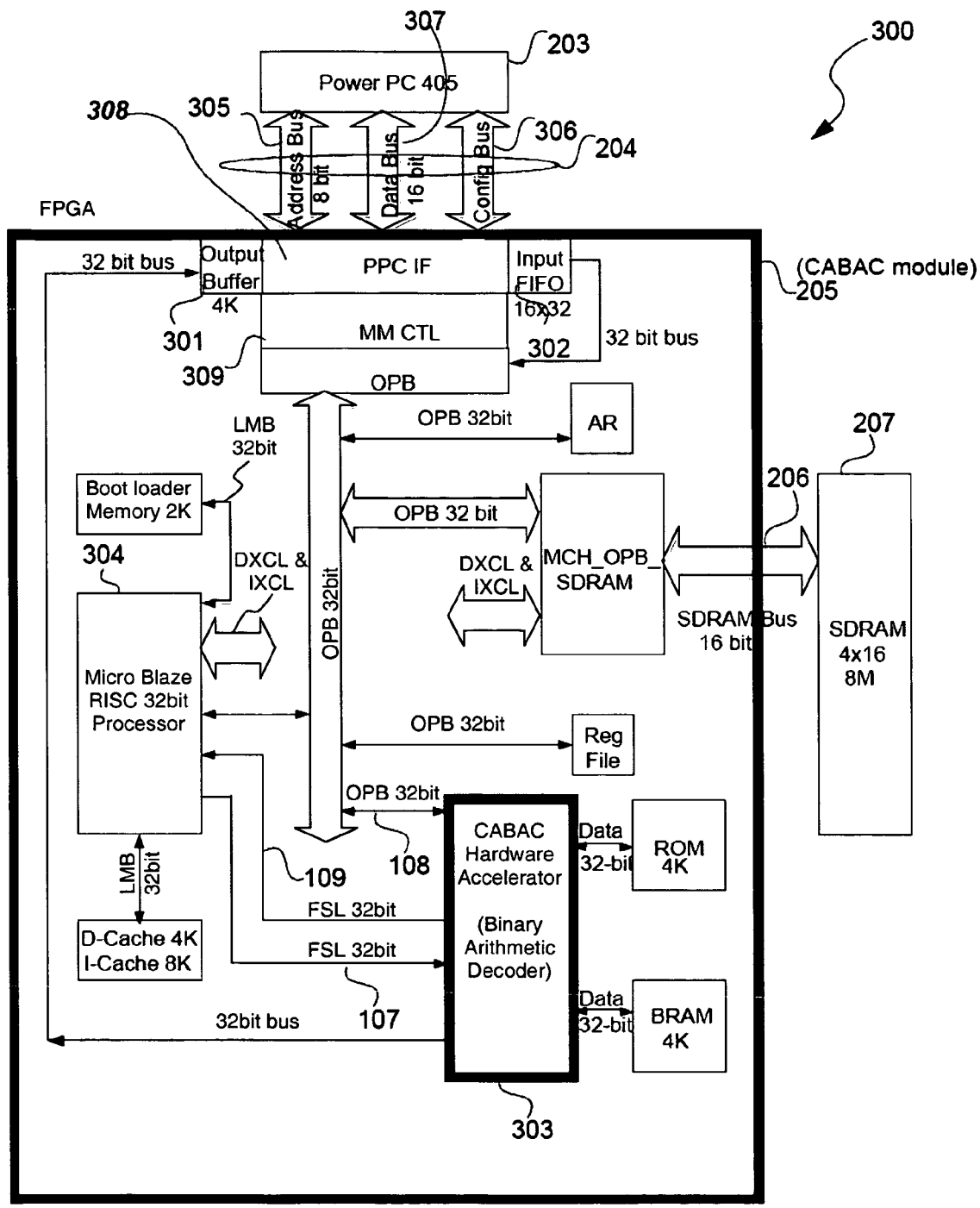
FIG. 3 shows a FPGA implementation of the CABAC module of FIG. 2.

FIG. 3 a functional block representation of the CABAC module 205 in FIG. 2 implemented using an FPGA. This top level FPGA design includes the following modules:
A Host interface 308;
A MicroBlaze 32 bit RISC Processor 304;
A Memory Controller 309;
The SRDAM/SRAM 207 (external to the actual CABAC module 205);
the CABAC Hardware Accelerator 303;
the input buffer 302; and
the output buffer 301.

Figure 4:
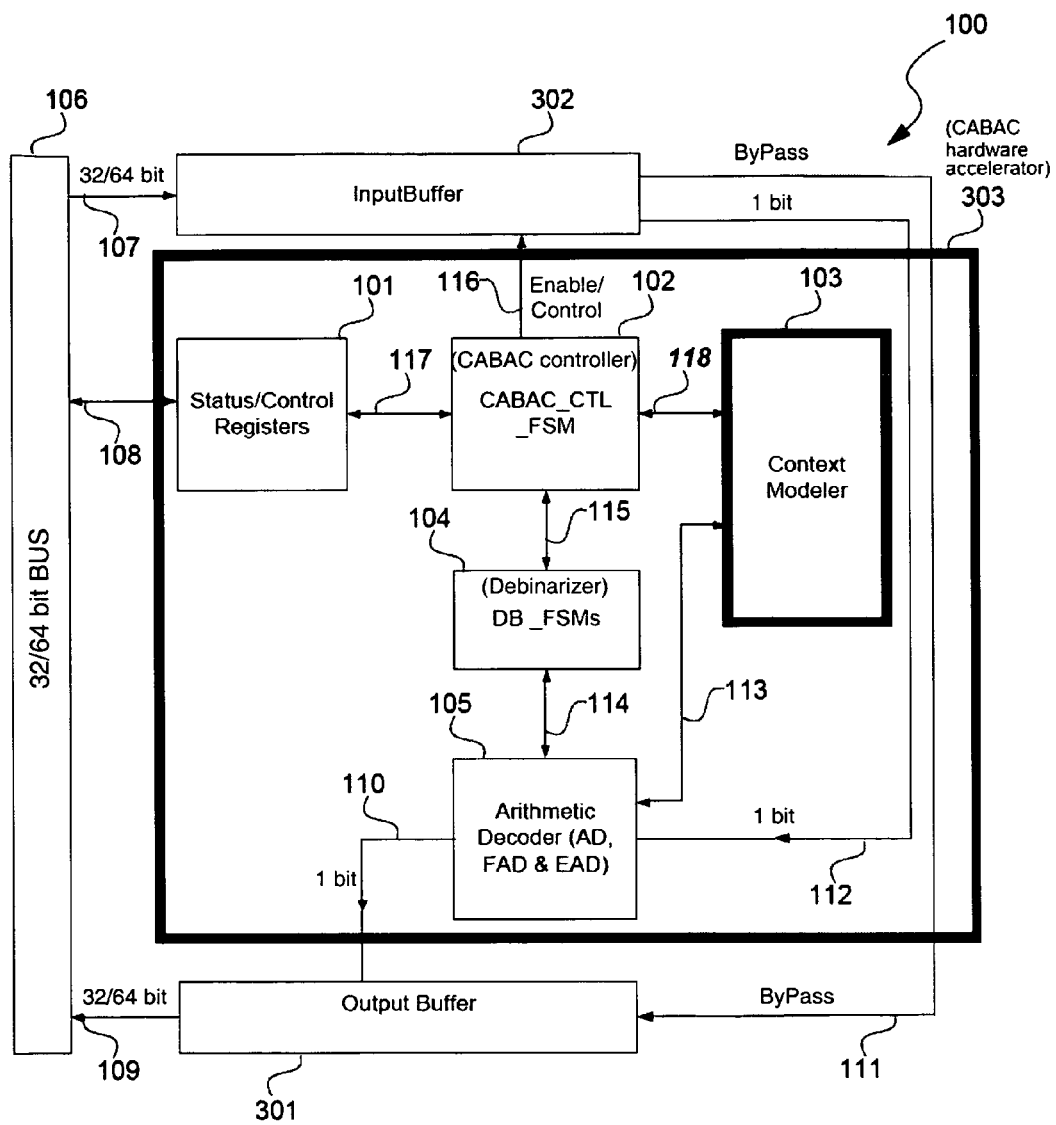
FIG. 4 is a functional block representation of a CABAC hardware accelerator in the CABAC module of FIG. 3.

FIG. 4 is a functional block representation of the CABAC hardware accelerator 303 in the CABAC module processor of FIG. 3. The CABAC accelerator includes the following modules: CABAC Controller (CABAC_CTL_FSM)

The CABAC controller 102 controls and monitors all the following major functional blocks:
CABAC Status/Control Registers 101;
Input Buffer 302;
Context Modeller 103;
Arithmetic Decoder 105;
Debinarizer 104; and
Output Buffer 301.

Arithmetic Decoder (AD_FSM, FAD_FSM & EAD_FSM)

The Arithmetic Decoder 105 uses the context values from the Context Model maintained by the Context modeller 103 to perform the context based arithmetic decoding. The decoded bit stream is sent to the debinarizer 104 for a branching decision, and subsequently, to the output buffer 301.

Debinarizer (DB_FSMs)

The debinarizer 104 (DB_FSM) is used to decode the incoming syntax element. The decoded data is then passed back to the host processor 203.

Context Modeler

The context modeller 103 initializes the context model during the beginning of the processing cycle for each new input slice. The Arithmetic Decoder 105 accesses/updates the state and MPS values from the Context Modeler 103.

The Input Buffer

The Input Buffer 302 is a memory buffer module (SRAM or BRAM) for storing the input slices of encoded bit stream data.

The Output Buffer

The Output Buffer 301 is a memory buffer module (SRAM or BRAM) to store the decoded bit stream of data.

Status/Control Registers

Status/Control Registers 101 are a set of status and control registers which are used primarily for software and hardware handshaking. The register sets store the following data:

Slice Length: the Processing core 304 signals the CABAC hardware accelerator 303 about the current decoding slice length and header length;

Slice Type, Model Number and QP value: use for the initialization of the context modeler 103;

CMi, CMj, TreeID: These are the syntax element related parameters used for decoding a particular syntax element;

DB: This is the decoded value from the CABAC hardware accelerator 303.

Figure 5:
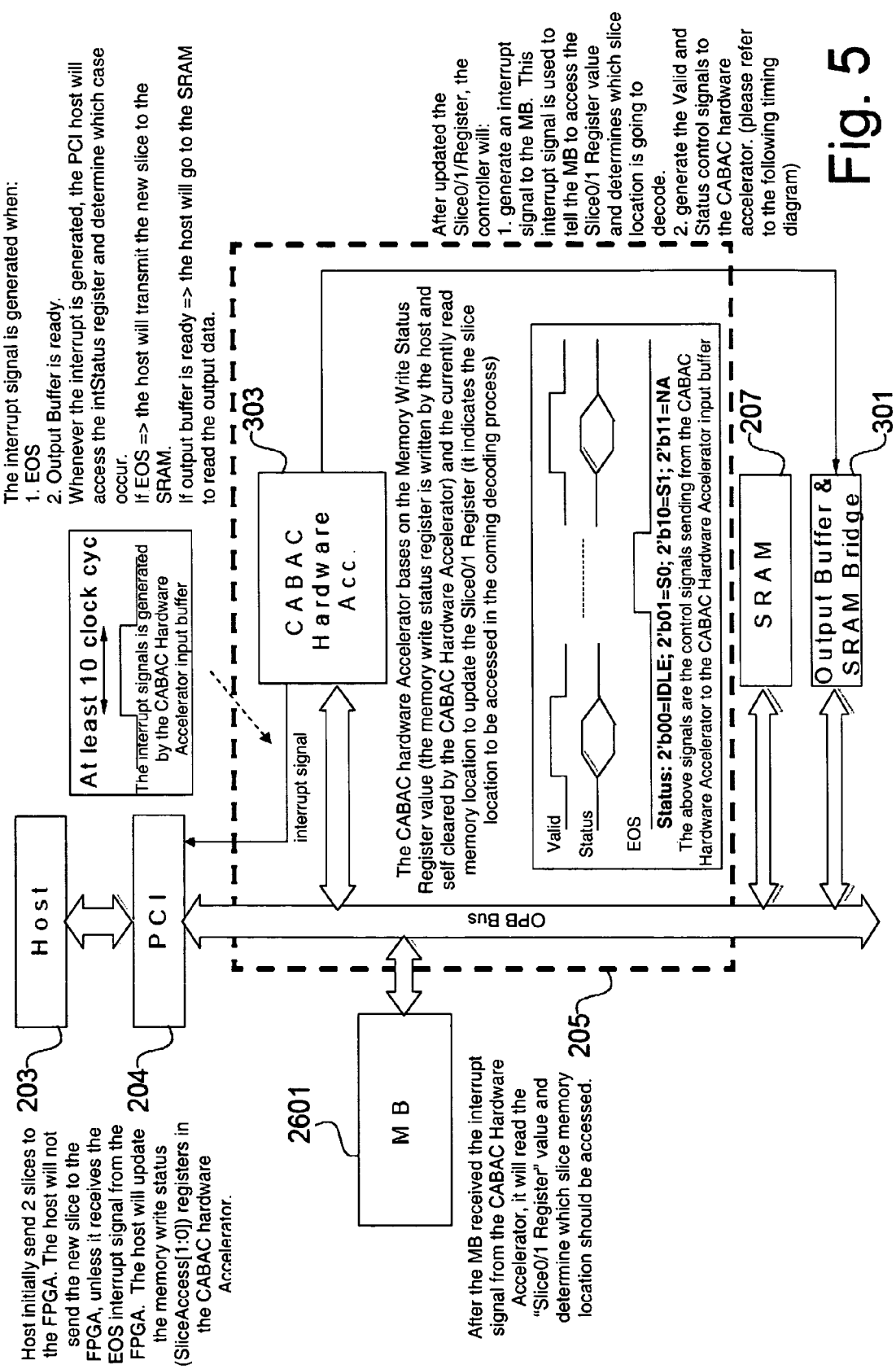
FIG. 5 depicts the operation of the arrangement of FIG. 2.

FIG. 5 depicts the operation of the CABAC module 205 in FIG. 3. The host 203 initially sends encoded data to the CABAC module 205, and in particular, to the CABAC hardware accelerator 303. The host 203 will not send further data to the CABAC module 205 until an interrupt signal is received by the host 203 from the CABAC module 205. The interrupt signal is generated by the CABAC hardware accelerator 303 either when an EOS signal is generated by the host 203, or (2) when the Output Buffer 301 contains decoded data ready for the host 203 to access.

Whenever the interrupt is generated, the host 203 accesses the registers 101 in the CABAC hardware accelerator 303 (see FIG. 4) to determine which of the aforementioned interrupts has occurred. If an EOS initiated interrupt signal has been generated, the host 203 updates the registers 101 in the CABAC Hardware Accelerator 303. The host 203 also transmits further encoded data to the SRAM 207.

If on the other hand the interrupt signal derives from the output buffer 301 being ready, then the host 203 reads output data from the SRAM 207. In particular, when the MB 2601 (MB stands for Micro Blaze which is the Xilinx RISC core processor) receives the interrupt signal from the CABAC Hardware Accelerator 303, the MB 2601 reads the registers 101 in the CABAC hardware accelerator 303 and determines which memory location in the SRAM 207 should be accessed. The CABAC Hardware Accelerator 303 uses the registers 101 and the current read memory location in the SRAM 207 to update the registers 101. After updating registers 101 the CABAC controller 102 performs the following:

(1) generates an interrupt signal to the MB to tell the MB to access the registers 101 and determine which memory location is to be read for the data to be decoded, and (2) generates control signals for the CABAC hardware accelerator 303 as depicted in the timing diagram inset in FIG. 5.

Returning to the CABAC controller 102 in FIG. 4, after the host processor 203 writes appropriate commands to the registers 101, the CABAC controller 102 sets up the constituent functional blocks of the CABAC accelerator 303 in order to perform the decoding process. The encoded data is downloaded to the memory buffer (SRAM) 207.

When the decoding process is completed, the debinarizer 104 transmits the decoded value to the CABAC controller 102. The controller 102 sends the decoded value to the MB Processor 304. This decoding process continues until the MB processor 304 sends an EOS signal to the CABAC controller 102.

The Power PC Processor 203 downloads data for decoding into the buffer memory 207 through the PPC/PCI interface 308. In doing so, 8×32 bit of slice data is written into the SDRAM 207 through the input buffer 302. For each new incoming slice stored in the SDRAM 207, the processor 304 starts to extract slice header information (ie Slice length, Header length, Slice Type, Model Number, QP, Context Model and TreeID) which is subsequently written to the CABAC status registers 101.

After the slice header paring process, the CABAC controller 102 determines the requisite information from the status registers 101 in order to setup the debinarizer 104, the context memory (CM) 1005 (see FIG. 7), and the Arithmetic Decoder (AD) 105.

After the initialization process, the hardware accelerator 303 uses the initialized context model and extracting the bit stream from the input buffer 302. The bit stream is then processed by the binary arithmetic decoder (AD/EAD/FAD) 105 and the debinarizer 104. The debinarized information (comprising meaningful syntax element values) is then passed to the processor 304 via the DB register. Prior to debinarization, the binary output bit stream is stored in the output buffer 301.

The following section of the description is directed primarily to the RUCM approach used to initialize the context model.

High Speed Context Memory Description

Each incoming video frame at 202 (see FIG. 2) is decomposed by the host 203 into slices, each slice comprising a significant number (ie a plurality) of syntax elements. The decoding process used by the CABAC module 205 in relation to each slice firstly extracts the header information from the header of the slice in question. This extracted slice header information is used for decoding all the syntax elements within the same slice. The extracted header information includes:
 header length
 slice length
 QP value
 Frame type (I/P frame)
 Model identifier number (the model used for CM)

After the slice header information is extracted, the CABAC controller 102 (also referred to as the top level controller; see FIG. 4) performs the following:
 sends the extracted QP value, Slice Type and Model Number to the context modeler 103 in order to initialize the context model 103 (this relates to non-by-pass slices), and the controller 102 waits for the context modeler 103 to complete the initialization process;
 enables the Arithmetic decoder 105 to load the bit stream from the input buffer 302 in order to decode each non-by-pass slice;

For by-pass slices, the top level controller 102 directly transfers the bit stream from the input buffer 302 to the output buffer 301. After the Context Model is initialized, the model provides the statistical information to the arithmetic coder to perform the decoding process.

The Context Model initialization process constitutes an overhead for the decoding process, particularly since about 512 bytes of data are required for each model.

Figure 6:
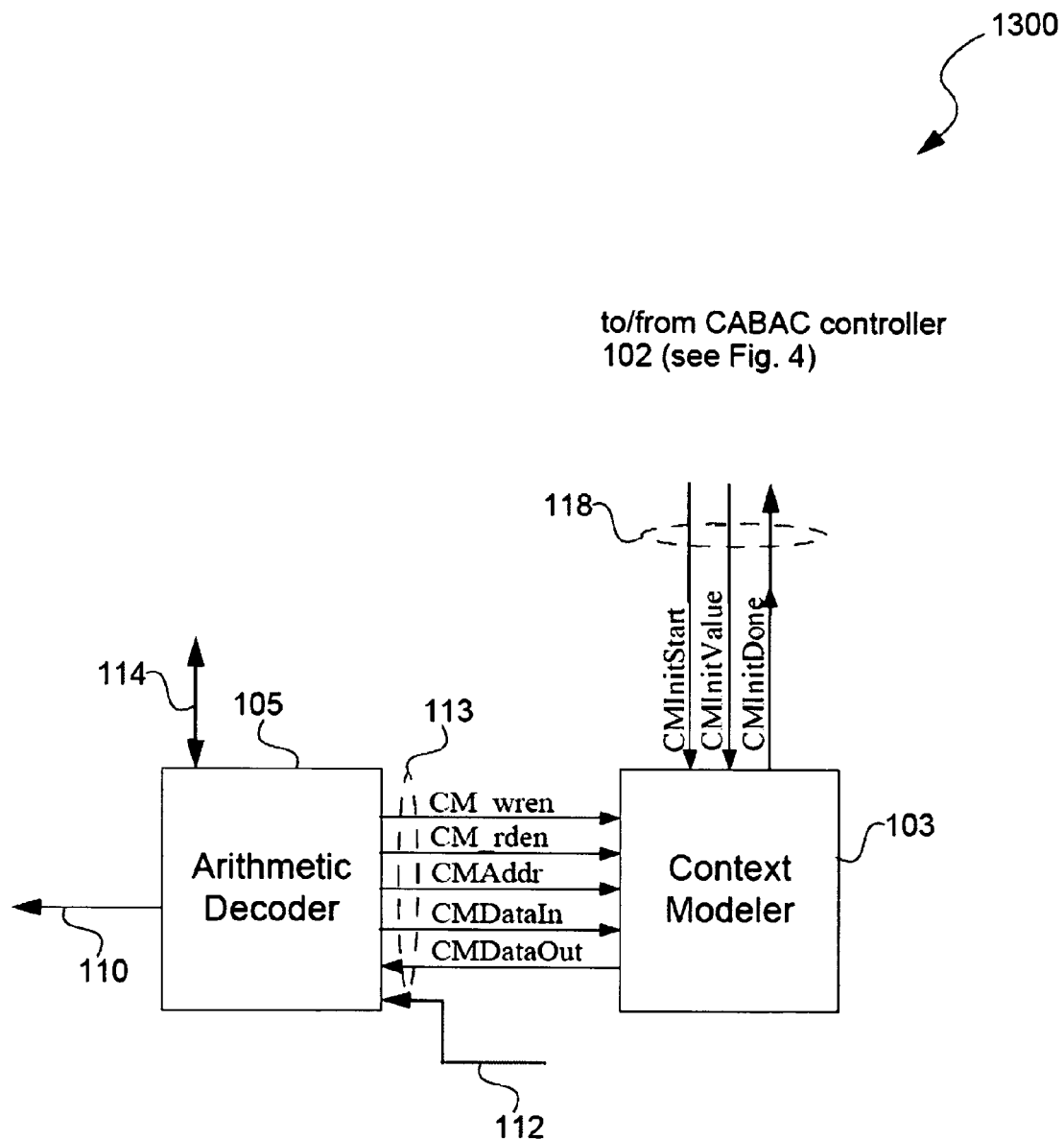
FIG. 6 shows data flow between an arithmetic decoder and a context modeller in the CABAC hardware accelerator of FIG. 4.

FIG. 6 is a representation of data flow between the CABAC controller 102 and the context modeller 103 in the CABAC accelerator 303. In order to decode each incoming slice, the CABAC controller 102 initializes the Context Model before the context modeler 103 is accessed by the Arithmetic decoder 105. The following signals are interchanged between the CABAC controller 102 and the Context Modeller 103:
 CMInitStart (this is a one clock cycle pulse which tell the context modeler 103 to initialize the memory content of a RAM 1005 (see FIG. 7) using an CMInitValue)
 CMInitValue (this contains the QP value, Slice Type and the Model Number)
 CMInitDone (The context modeler 103 uses CMInitValue to incrementally generate corresponding ROM and RAM addresses. The context modeler 103 also enables the RAM 1005, ROM 1001 and ALU 1003 modules (see FIG. 7) to calculate and store the context model content. After the initialization process is completed, the context modeler 103 sends the CMInitDone signal to the CABAC controller 102).

After the controller 102 receives the CMInitDone signal, the controller 102 enables the Arithmetic decoder 105 to perform the context model memory read/write operations.

The described control mechanism provides a relatively simple control interface for the top level control module 102. The control module 102 is thus only required to provide the CMInitValue and the CMInitStart to the context modeler 103. Thereafter the top level controller 102 waits for the CMInitDone signal to be sent back from the context modeler 103. When the controller 102 receives the CMInitDone signal from the context modeler 103, the controller 102 releases control to the Arithmetic Coder 105. This approach reduces the burden on the top level control logic of the controller 102.

Figure 7:
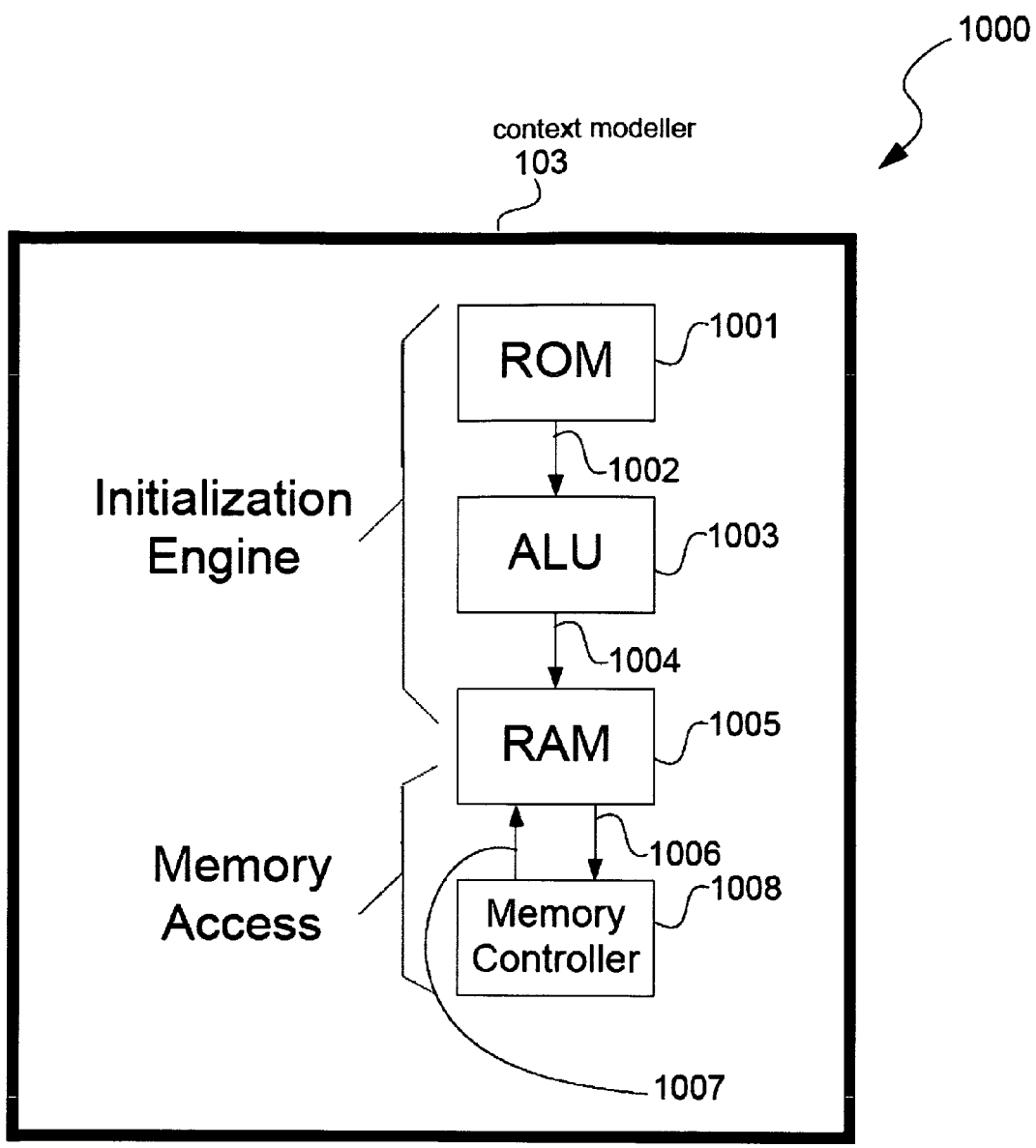
FIG. 7 is an illustrative functional block representation of the context modeller of FIG. 4.

FIG. 7 is a functional block representation 1000 of the context modeller of FIG. 4. The context model operation comprises two logically distinct processes namely:
 1. Initialization
 2. Memory Access An Initialization Engine comprising a ROM 1001, an ALU 1003 and a RAM 1005, communicating as indicated in FIG. 7, calculates the context model value according to the QP value, Model Number and Slice Type. The initialization and memory access processes do not occur simultaneously. Memory Access is implemented via a memory read/write interface by which the arithmetic decoder 105 accesses the content of the context modeler 103.

The top level controller 102 (see FIG. 4) ensures that the initialization process is complete before the memory access process starts, in order to prevent conflict in the memory access process between the memory controller and the ALU.

The following techniques are used to provide rapid memory initialization, ease of interface to the memory controller, and a relatively simple control mechanism:
 Re-organized Data Structure
 Parallelism
 Pipeline
 Simple Control Mechanism
 Read after Write Memory Access
 Different Clocking Scheme Reducing Hardware Complexity by Rearranging the Data The context model assigns a model probability distribution to symbols, the model being used for generating the code at the subsequent decoding stage. The statistics of this model are updated after every decoding cycle. The model typically consists of a table of entries each of which represents a context model category which consists of a probability value and a MPS (Most Probable Symbol). The table is accessed and updated by the arithmetic decoding stage after being initialized.

In order to simplify the hardware implementation, the disclosed RUCM arrangements adopt a particular data structure for the context model. Uninitialized m,n values (also referred to as context model values), typically each represented by an 8 bit number comprising 1 bit for the sign and 7 bits for the magnitude, are categorized according to the H.264 standard into the following 16 groups (ie categories):
 CTX_MB_TYPE
 CTX_B8_TYPE
 CTX_MV_RES
 CTX_REF_NO
 CTX_DELTA_QP CTX_MBAFF
CTX_IPR
CTX_CIPR
CTX_CBP
CTX_BCBP
CTX_MAP
CTX_LAST
CTX_ONE
CTX_ABS
CTX_FLD_MAP
CTX_FLD_LAST FIG. 8 shows the context model 1600 categorized into the above-noted groups which are arranged in tabular form 1600. Each category such as CTX_MB_TYPE (as depicted by a reference numeral 1601) can be further divided (decomposed) into sub-groups, also referred to as models (as depicted by a reference numeral 1602). Accordingly, the category CTX_MB_TYPE (ie 1601) is divided into four sub-groups (ie models, as depicted by a reference number 1610) by slice type and model number as follows (see 1603):

I/N0
P/N0
P/N1
P/N2

Where each model has 33 pairs of m,n values (as depicted by a reference numeral 1604) which are also referred to as context model values.

Not all categories however contain four models. Thus, for example, the CTX_B8_TYPE, CTX_MV_RES and CTX_REF_NO categories (respectively designated by reference numerals 1605, 1606 and 1607) only have 3 models each as follows:

P/N0
P/N1
P/N2

Furthermore, the CTX_DELTA QP category (designated as 1608 in FIG. 8) has only one model. It can be seen, however, that most of the context models contain four set of models. It is noted in FIG. 8 that there are a total of 465 models in all (see reference numeral 1609).

In order to simplify hardware implementation and performance, the disclosed RUCM arrangements modify the data structure for those categories which contain less than four models by adding dummy data as will be shown.

Figure 9:
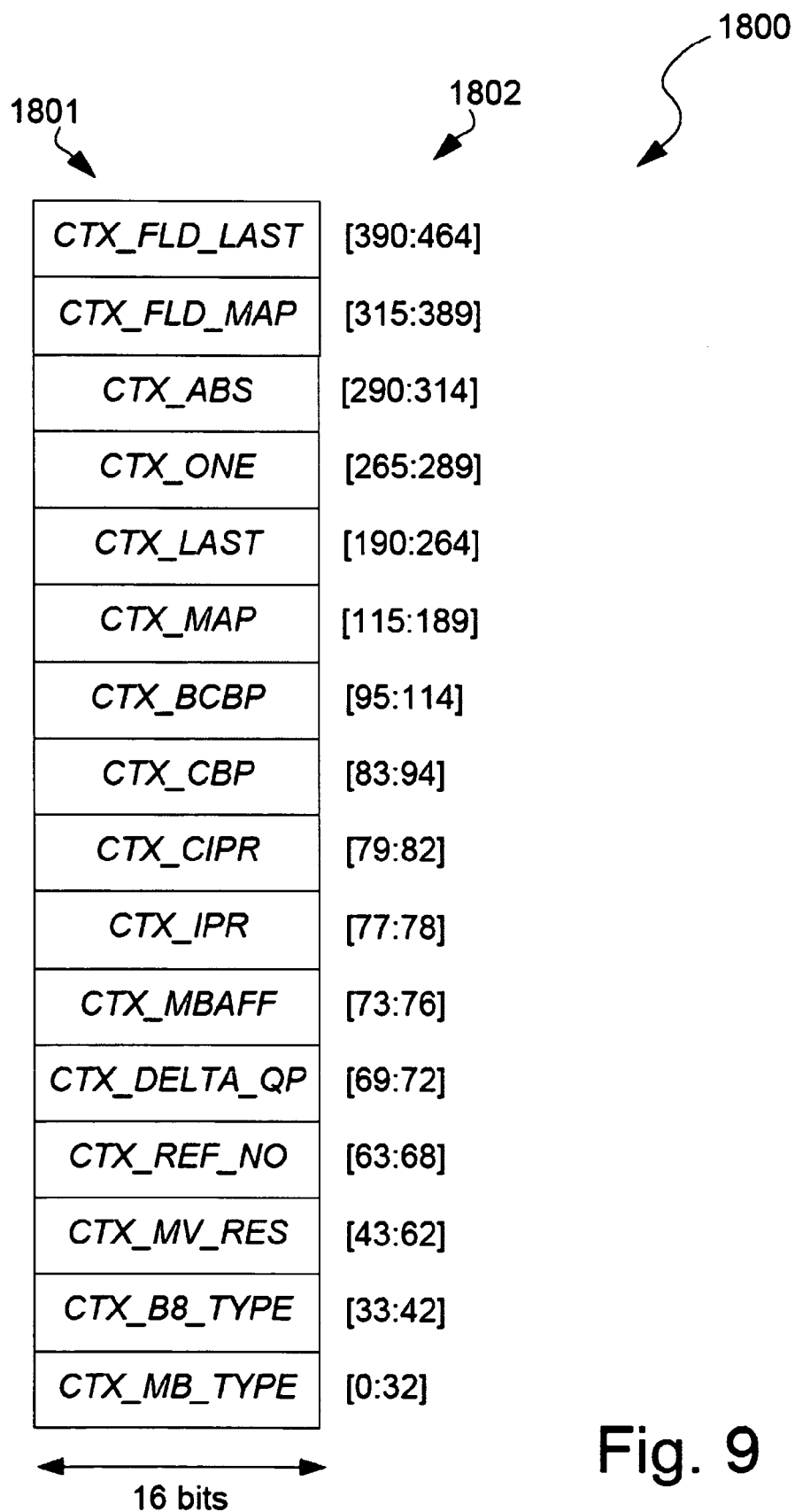
FIG. 9 depicts the information of FIG. 8 after padding to achieve a uniform data structure arrangement.

FIG. 9 shows the categories (1801) depicted in FIG. 8, where the memory space (1802) allocated to the categories has, where necessary, been padded out to a uniform size which can accommodate four models (ie sub-groups) per category. According to this approach using dummy data, each of the four models associated with each category can accommodate 465 data bytes as depicted at 1802 in FIG. 9. Accordingly, in the context model memory arrangement used in the RUCM approach, all data with the same slice type (ie category) and model number is packed into memory location 0 to 464. Accordingly, the four set of models I/N0, P/N0, P/N1, and P/N2 are packed in memory locations 0 to 464. The noted models are placed into the memory with an offset equal to 465. Six bytes of zero padding is added to each model. These six bytes are added in order to ensure that the number of bytes in a particular model are be divisible by 4 (Since 4 16 bits data are padded to form the 64 bits data structure.). This approach enables the four pairs of m,n values to be packed into the same memory location, ie 16 bit data is packed into 64 bits wide memory.

Figure 10:
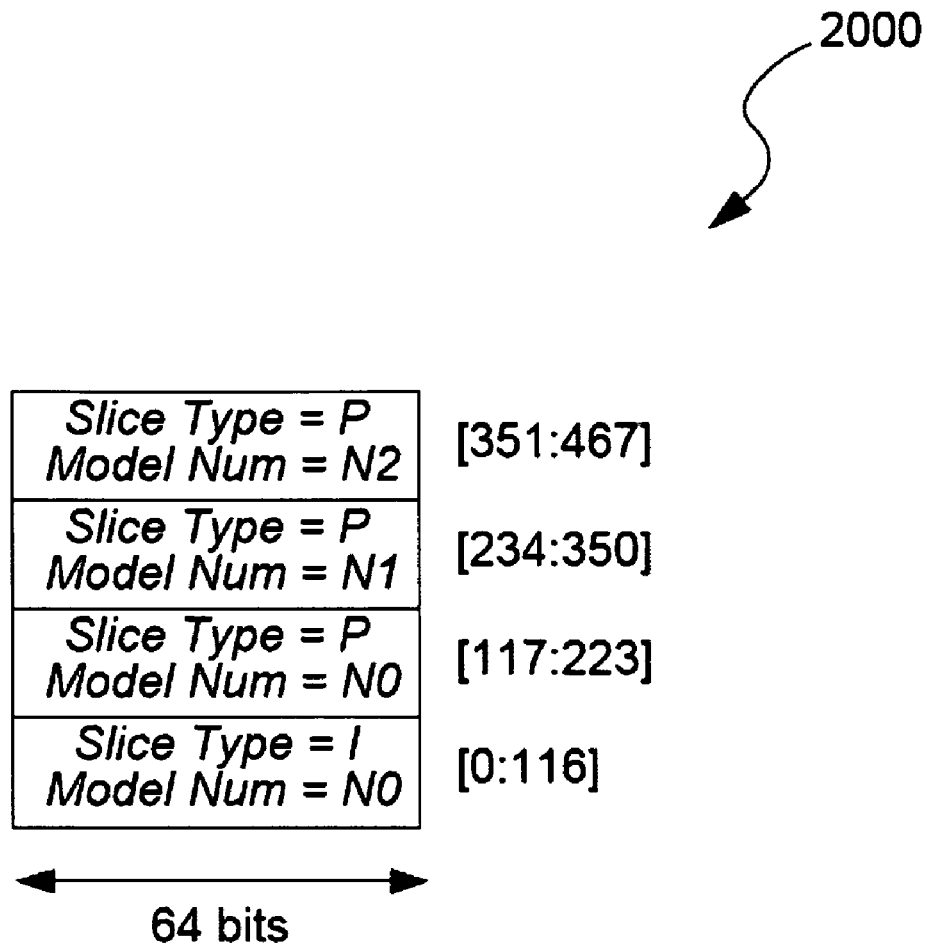
FIG. 10 shows the 64 bit with difference slice type and model number data structure of FIG. 9 in detail.

FIG. 10 shows how the data structure is arranged in order to allow the hardware to perform parallel processing by mapping 16 bit data in a 64 bit memory arrangement. This means that four set of m,n values can be read from the ROM 1001 in a single clock cycle access time. Each category is packed with the same amount of data.

FIG. 11 shows how each category (eg 1901) comprises four sub-groups (such as 1903-1906) which occupy 64 bits×117 memory locations (as shown by 1902). Therefore whenever the slice type and model number is determined, the initialized memory ROM address will be equal to N×117 (where N=0, 1, 2, 3).

This fixed size data group simplifies the hardware logic, since the hardware can simply use the slice type and the model number (ie the sub-group identifier) to determine the starting address by adding a fixed offset address.

Physical Hardware Structure Overview

Returning to FIG. 7, it is noted that the arrangement four elements being the ROM 1001, the Context Model Initialization ALU 1003, the Single Port RAM 1005 and the Memory Controller 1008.

ROM

The ROM 1001 stores the m and n values which are used to initialize the context model according to different QP value, slice types and model numbers. The data width of the ROM is equal to 64 bits, and in particular the ROM size is 512×64 bits. Each memory location is used to store four sets of m and n values. These four sets of data are stored in a parallel manner inside the ROM 1001 to this enable the four sets of replicated ALUs to perform parallel processing. Each m and n value is represented by an 8 bit number comprising one bit for the sign and seven bits for the magnitude.

Figure 12:
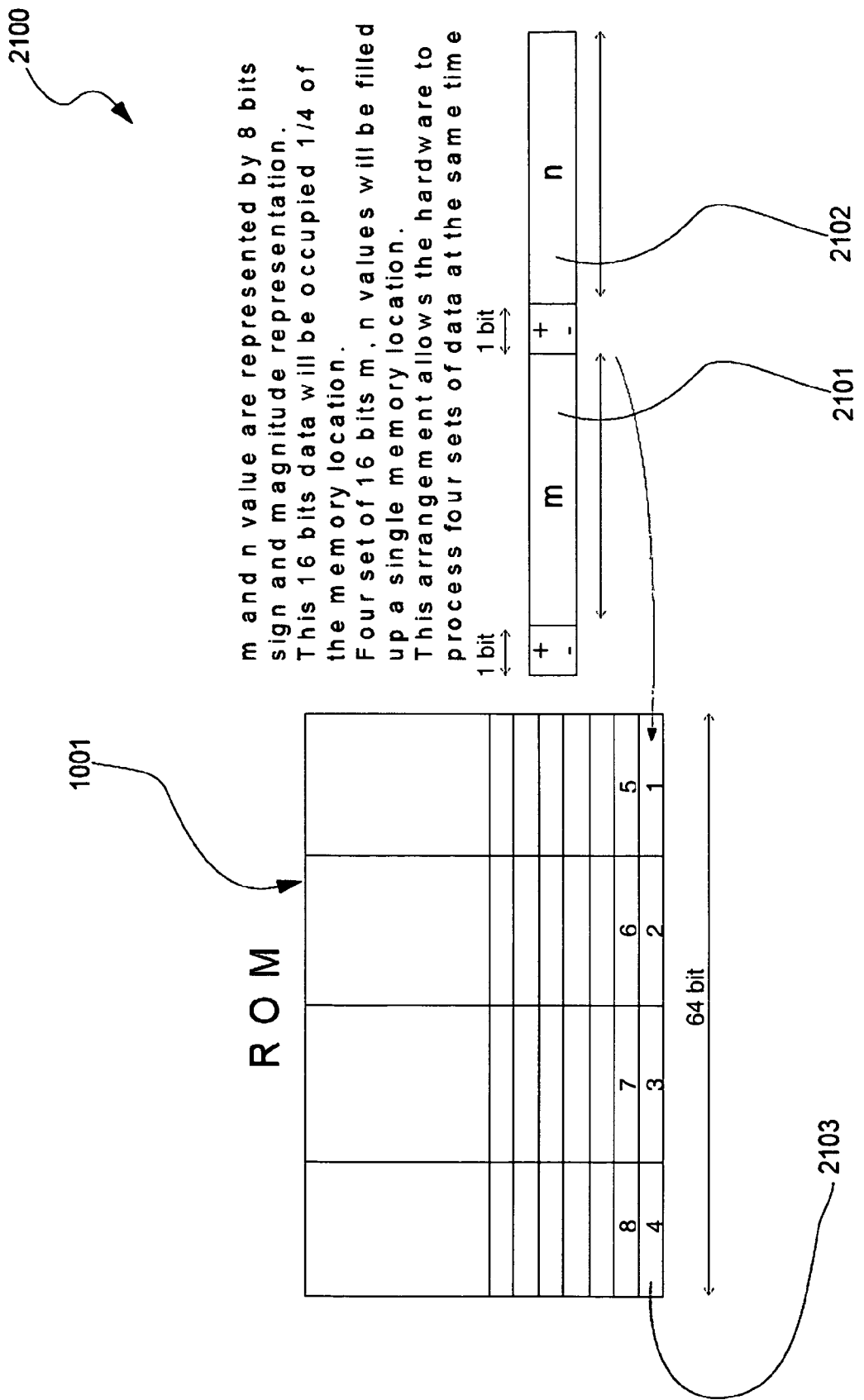
FIG. 12 shows how m,n values are stored according to the disclosed RUCM arrangements.

FIG. 12 shows how the aforementioned m and n values (depicted by 2101 and 2102) are represented by 8 bits sign and magnitude representation. The 16 bit data constituting an m,n pair occupies one quarter of a memory location 2103 in the ROM 1001. Accordingly, four sets of 16 bits m,n values occupy a single memory location. This arrangement allows the hardware to process four sets of data at the same time (ie concurrently).

Context Model Initialization ALU

Figure 13:
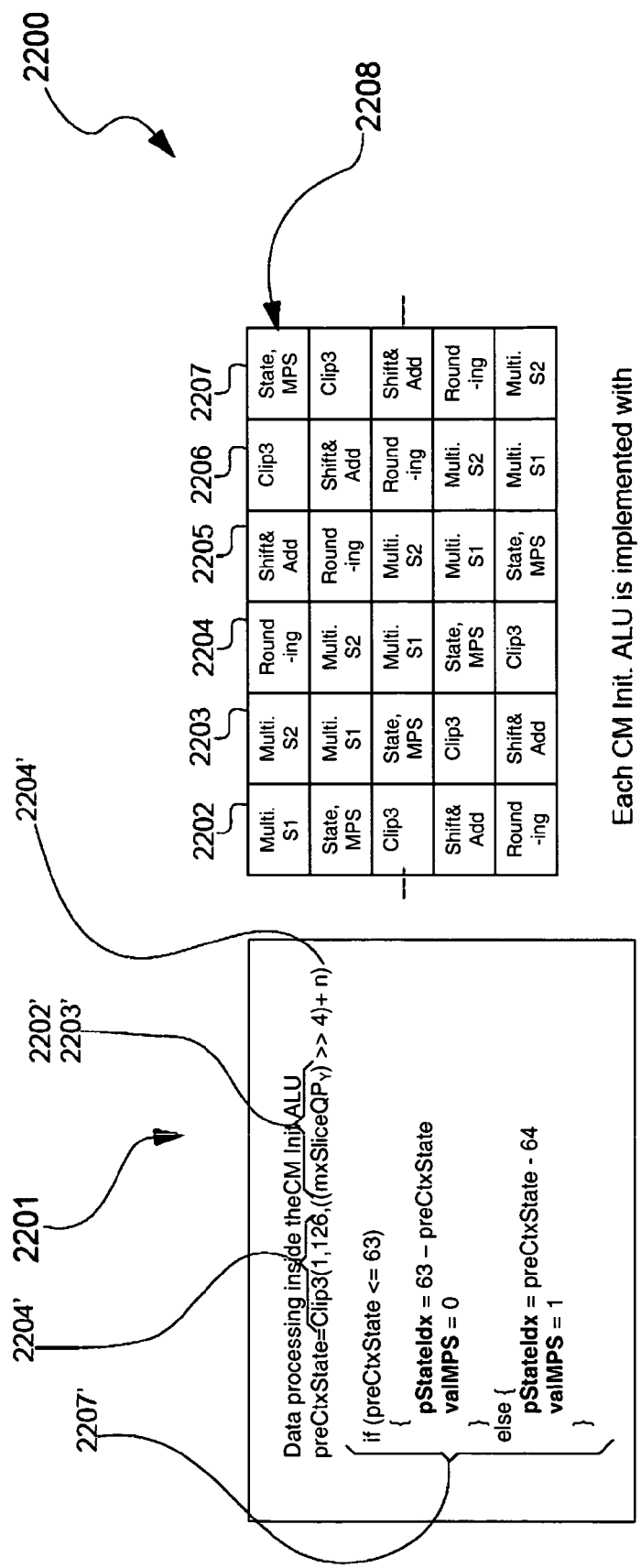
FIG. 13 depicts the ALU pipeline structure.

The CM initialization ALU 1003 is used to calculate the initialization formula (see 2201 in FIG. 13). The arithmetic logic module 1003 performs operations including includes multiplication, addition, rounding, and so on. In order to increase the throughput of the ALU 1003, the ALU data path is implemented using a six stages pipeline in the present example. It is noted that the ALU 1003 can be divided into any number of pipeline stages depending upon the system clock used. There are thus four sets of identical ALU hardware which are used to initialize the context model values.

FIG. 13 shows the initialization formula 2201 and depicts the six stage pipeline structure of the ALU data paths. Each of the six stages is associated with corresponding operations in the formula 2201. Accordingly, for a given pipeline such as 2208, pipeline stages 2202 and 2203 evaluate that part of the formula 2201 referred to by reference numerals 2202' and 2203'. Similarly, pipeline stage 2207 evaluates that part of the formula 2201 referred to by reference numerals 2207'.

Single Port RAM

Figure 14:
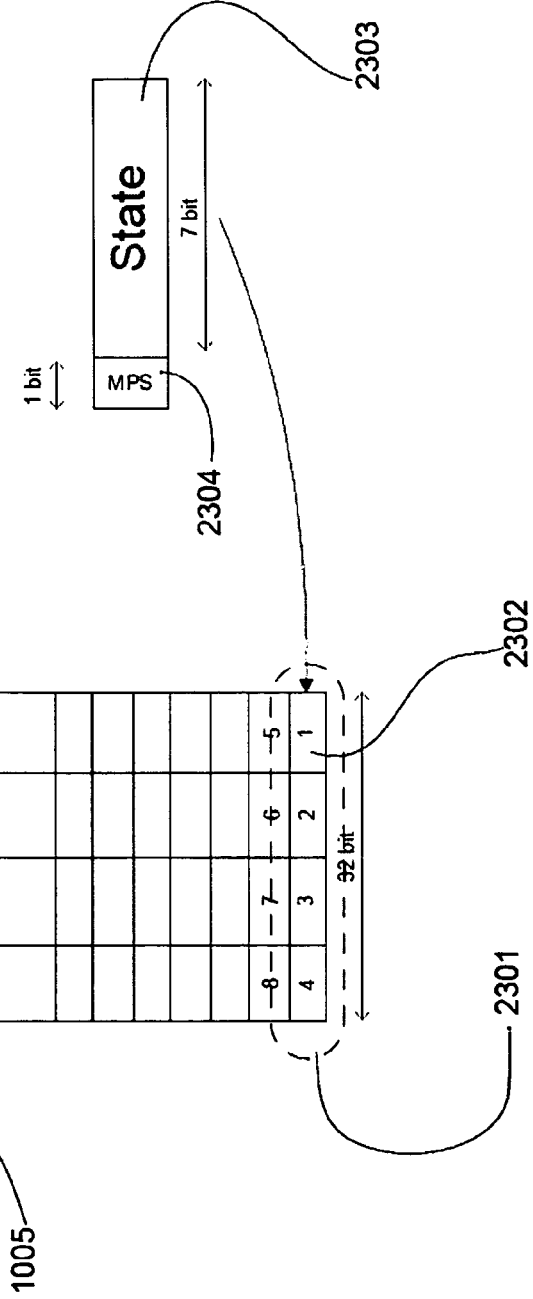
FIG. 14 depicts the single port RAM in the context modeller of FIG. 7.

FIG. 14 shows the single port RAM 1005 used to store the initialized MPS and state values determined by the ALU 1003. Four set of data such as 2302 are stored in each memory location 2301 the RAM 1005. Each set of m,n values in the ROM 1001 is initialized (see FIG. 15) and the initialized results are stored in this single port RAM 1005. Accordingly, there are a total of 465 context models stored inside the RAM

1005. The data width of the RAM 1005 is 32 bits, and in particular the RAM size is 128×32 bits (in a Single-Port configuration).

Each memory location such as 2301 is used to store 4 sets of state and MPS values, each set being depicted, for example, by the reference numeral 2302. A 7 bit data structure 2303 is used to store the state value, and a further single bit 2304 to store the MPS value. The MSB 2304 represent the MPS value, while the remaining 7 bits 2303 represent the state value. A 32 bits to 8 bits memory space conversion logic (see FIG. 16) is used with this RAM 1005. The memory space conversion provides simple and efficient access for the CABAC controller 102 which performs the read write operations.

Figure 15:
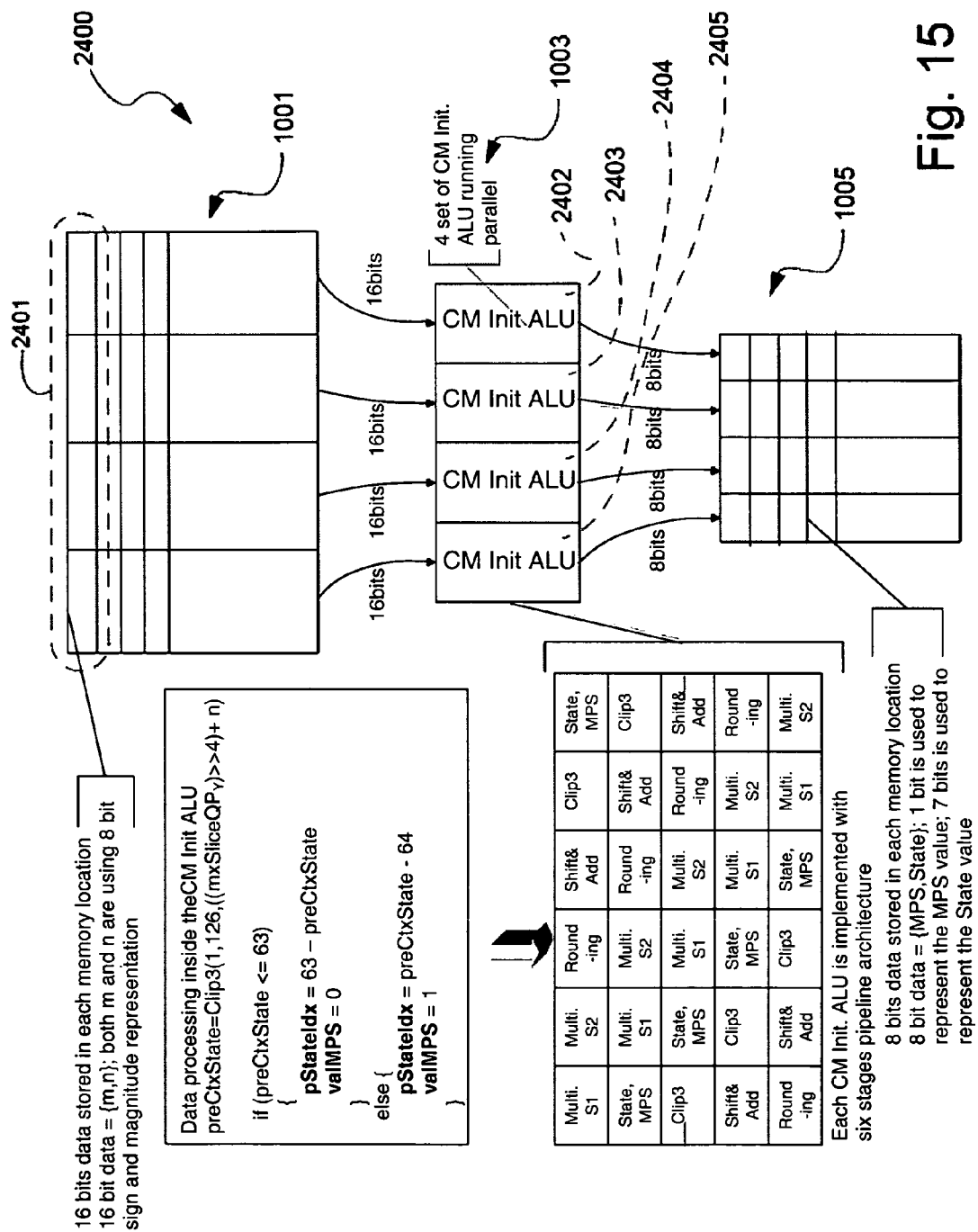
FIG. 15 depicts the data path from the ROM through the ALU to the RAM in the context modeller of FIG. 7.

FIG. 15 shows the data path between the ROM 1001 and the RAM 1005. Four pairs of data are stored inside the same memory location 2401 inside the ROM 1001. After a particular set of uninitialized data in the ROM 1001 is selected, these data pass through the ALU 1003. This ALU 1003 contains four sets of identical hardware 2402-2405 each of which is implemented using a 6 stage pipeline (in the present example). After the results are calculated, ie the model values are initialized, the ALU 1003 stores the initialized values in the single port RAM 1005.

FIGS. 13 and 15 show one example of how multiple sets of context model values can be applied in a concurrent manner to the initialization formula 2201, however other arrangements can also be used to achieve concurrent processing.

Memory Controller

Figure 16:
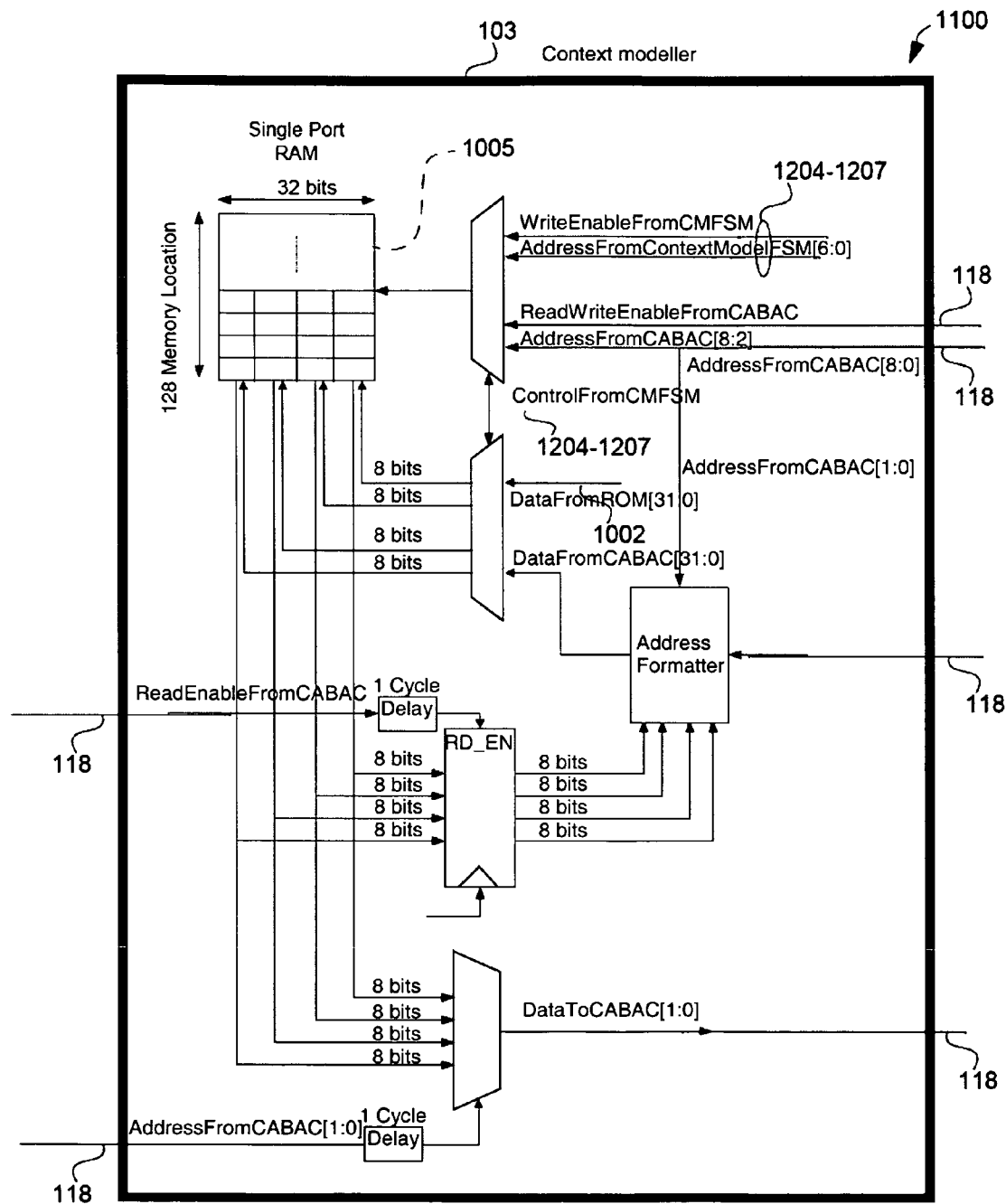
FIG. 16 shows the RAM of FIG. 14 in more detail.

FIG. 16 shows how the Single Port RAM 1005 stores the initialized data and provides the statistical information for the Arithmetic Coder. The Memory Controller controls two data paths for the context modeler 103, these paths being a ROM access path and an Arithmetic decoder access path. A ControlFromCMFSM signal (1204-1207) signal is provided by the context modeler 103 to select the data path coming from the ROM 1001 and/or the Arithmetic decoder 105. If the ControlFromCMFSM signal selects the ROM data path, the following signals are produced:

1. WriteEnableFromCMFSM (write enable signal generated from CM FSM designated 1204-1207)
2. AddressFromContextModelFSM (address to be written by the CM FSM designated 1204-1207)
3. DataFromROM (the initialized data from the ROM designated 1002) to the Single Port RAM 1005.

The above-noted signals result in the initialized data being written to the Single Port RAM 1005. The addresses for the ROM 1001 and the RAM 1005 are generated automatically by the context modeler 103.

If however the ControlFromCMFSM selects the Arithmetic decoder data path, this results is a Read Operation being performed. During this read operation, the Arithmetic decoder generates the following signals:

1. ReadEnableFromCABAC (designated 118), this being:
   The Read enable signal for reading data from the Single Port RAM 1005.
   Also used to latch the output data (from the Single Port RAM 1005) which will be used for the write operation.

2. AddressFromCABAC (designated 118) this being:
   used to select one of the memory locations (there are totally 128 memory locations)
   used to select which byte in particular should be transferred to the DataToCABAC line (designated 118).

3. DataToCABAC (designated 118) this being:
   Data read from the Single Port RAM 1005.

During the read operation, the Arithmetic decoder 105 generates the following signals:

1. WriteEnableFromCABAC (designated 118) this being:
   Used to enable data to be write data to the Single Port RAM 1005;

2. AddressFromCABAC (designated 118) this being:
   used to select one of the memory locations (there are totally 128 memory locations)
   used to pack the DataFromCABAC with the previous latched (data latched in the read operation) data. The Address Formatter is used to pack the incoming 8 bit DataFromCABAC with the previous read data into a 32 bit data. This packed data is used to update the Single Port RAM 1005 according to the AddressFromCABAC signal 3. DataFromCABAC (designated 118) this being:
   8 bits data for writing into the Single Port RAM 1005

It is evident that the memory module depicted in FIG. 16 performs the Read Operation (from the ROM 1001) before any Write Operation (to the RAM 1005). This mode of operation is identical to that performed by the Arithmetic decoder 105. The disclosed RUCM decoding process requires that the Arithmetic decoder obtain the state and MPS values from the RAM 1005 (via a read operation) in order to perform the decoding process. Thereafter, the RUCM arrangement updates (via a write operation) the context memory with a new state and MPS values.

Accordingly, the CABAC hardware accelerator 303 accesses the context memory with alternating read and write operations. The Write Enable signal 1204-1207 is required to wait for one more clock cycle after the Read Enable signal 118 is generated. This is required because the memory controller needs to wait for one additional clock cycle after the read enable is generated in order to latch the fetched data. This mechanism does not increase the overall delay of the RUCM system, because the Arithmetic decoder 105 takes more than one clock cycle to perform the decoding process after it reads the context model.

The internal operation of the context modeler 103 is transparent to the external memory access device, which can simply send a read/write enable signal to access the content of the memory.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

The invention claimed is:

1. A method of decoding a data stream comprising a plurality of video frames that have been encoded using Context-based Adaptive Binary Arithmetic Coding, the method comprising the steps of:
   decomposing a current video frame into slices each comprising slice data and slice header information;

storing a context model comprising a plurality of context model values in a manner that enables concurrent processing of a set of the context model values;
identifying a non-bypass slice;
initializing the context model using header information of the identified slice; and
decoding the slice data of the identified slice dependent upon the initialized context model.

2. The method of claim 1, wherein the initializing step comprises concurrently applying sets of the stored context model values to an initialization formula to thereby determine corresponding sets of initialized context model values in the initialized context model.

3. The method of claim 2 comprising the further steps of
identifying another non-bypass slice of the current frame;
defining the initialized context model to be the context model for the storing step; and
repeating the storing, identifying, initializing and decoding steps using the slice data and the slice header information of the identified other slice.

4. The method of claim 3, wherein the storing step comprises the steps of:
categorizing the context model values of the context model into categories defined by the H.264 standard;
decomposing each category into sub-groups according to the header information of the identified other slice;
padding sets of the sub-groups in each category to a uniform size; and
storing the sets of padded sub-groups in a parallel manner thereby enabling the concurrent processing of the sets of context model values.

5. The method of claim 4, wherein:
each of the sub-groups has an identifier; and
the storing step comprises, for each set of padded sub-groups, storing the set of padded sub-groups in the same memory location which is addressable using an identifier of a sub-group in the set.

6. An apparatus for decoding a data stream comprising a plurality of video frames that have been encoded using Context-based Adaptive Binary Arithmetic Coding, said apparatus comprising:
a memory for storing a program; and
a processor for executing the program, said program comprising:
code for decomposing a current video frame into slices each comprising slice data and slice header information;
code for storing a context model comprising a plurality of context model values in a manner that enables concurrent processing of a set of the context model values;
code for identifying a non-bypass slice;
code for initializing the context model using header information of the identified slice; and
code for decoding the slice data of the identified slice dependent upon the initialized context model.

7. An apparatus for decoding a data stream comprising a plurality of video frames that have been encoded using Context-based Adaptive Binary Arithmetic Coding, the apparatus comprising:
means for decomposing a current video frame into slices each comprising slice data and slice header information;
means for storing a context model comprising a plurality of context model values in a manner that enables concurrent processing of a set of the context model values;
means for identifying a non-bypass slice;
means for initializing the context model using header information of the identified slice; and
means for decoding the slice data of the identified slice dependent upon the initialized context model.

8. The apparatus of claim 7, wherein the means for initializing comprises means for concurrently applying sets of the stored context model values to an initialization formula to thereby determine corresponding sets of initialized context model values in the initialized context model.

9. The method of claim 8 further comprising;
means for identifying another non-bypass slice of the current frame;
means for defining the initialized context model to be the context model for the storing step; and
means for repeating the storing, identifying, initializing and decoding steps using the slice data and the slice header information of the identified other slice.

10. The method of claim 9, wherein the means for storing comprises:
means for categorizing the context model values of the context model into categories defined by the H.264 standard;
means for decomposing each category into sub-groups according to the header information of the identified other slice;
means for padding sets of the sub-groups in each category to a uniform size; and
means for storing the sets of padded sub-groups in a parallel manner thereby enabling the concurrent processing of the sets of context model values.

11. The apparatus of claim 10, wherein:
each of the sub-groups has an identifier; and
the means for storing comprises, for each set of padded sub-groups, means for storing the set of padded sub-groups in the same memory location which is addressable using an identifier of a sub-group in the set.

12. A context modeller used in decoding data encoded using Context Adaptive Binary Arithmetic Coding, said context modeler comprising:
a Read Only Memory for storing uninitialized context model values, said uninitialized context model values being stored in the Read Only Memory in a manner that enables a plurality of uninitialized context model values to be read from the Read Only Memory in a single clock cycle;
an Arithmetic Logic Module comprising a plurality of parallel processing paths, each said processing path comprising a plurality of pipeline stages;
a Random Access Memory; and
a memory controller for determining, using the Arithmetic Logic Module operating on said plurality of uninitialized context model values read from the Read Only Memory in each clock cycle, initialized context model values for storage in the Random Access Memory based upon header information in said incoming encoded data.

13. The method of claim 12, wherein said the Read Only Memory stored the rearranged data structure which can simplify the hardware implementation.

14. The method of claim 13, wherein said the data structure contains the dummy value which can pad the uninitialized data into a fixed amount of data.

15. The method of claim 13, wherein said the data structure can be accessed by adjust the fixed offset.

16. The method of claim 13, wherein said four set of the data can be access at the same time which can speed up the initialization time.

* * * * *